Figure 1:
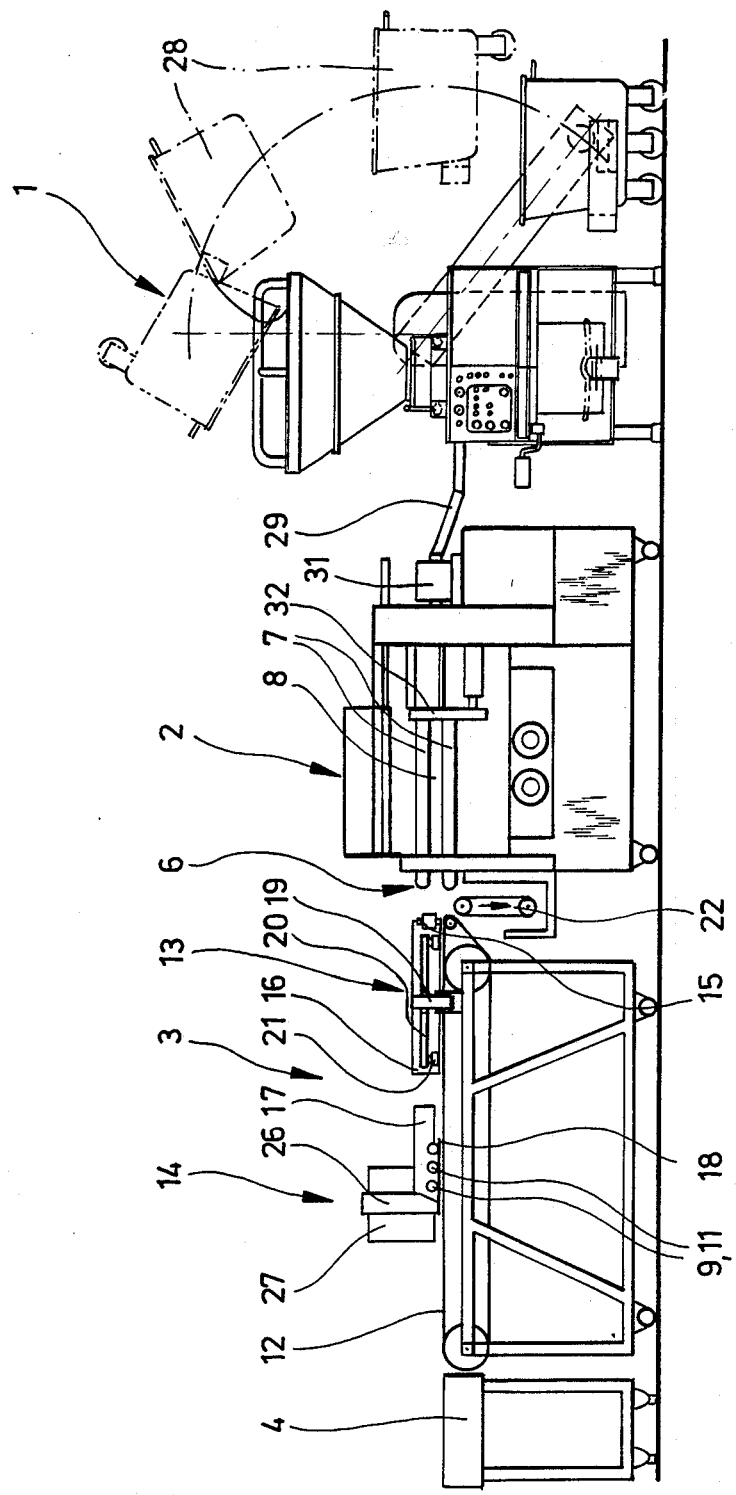

United States Patent [19]

Burger et al.

[11] Patent Number: 4,979,267
[45] Date of Patent: Dec. 25, 1990

[54] METHOD AND APPARATUS FOR ARRANGING SAUSAGES IN GROUPS SUITABLE FOR PACKING

[75] Inventors: Karl Burger, Ingoldingen-Muttensweiler; Karl Hummel; Gerhard Korostenski, both of Biberach an der Riss; Georg Staudenrausch, Biberach, all of Fed. Rep. of Germany

[73] Assignee: Albert Handtmann Maschinenfabrik GmbH & Co. KG, Biberach, Fed. Rep. of Germany

[21] Appl. No.: 417,720

[22] Filed: Oct. 5, 1989

[30] Foreign Application Priority Data

Nov. 2, 1988 [DE] Fed. Rep. of Germany ....... 3837222

[51] Int. Cl.⁵ ............................................ A22C 11/00
[52] U.S. Cl. ..................................... 452/51; 452/179; 53/147; 53/537; 206/821; 426/352

[58] Field of Search ..................... 17/45, 1 R, 1 F, 33, 17/34; 206/821; 53/147, 537, 531, 540, 544, 543, 158, 150; 426/392

[56] References Cited

U.S. PATENT DOCUMENTS

| | | | |
|---|---|---|---|
| 3,121,638 | 2/1964 | Tauber et al. | 17/1 F |
| 4,339,846 | 7/1982 | Zamiara | 17/44.4 |
| 4,547,931 | 10/1985 | Staudenrausch et al. | 17/1 F |
| 4,682,385 | 7/1987 | Kasai et al. | 17/1 F |

Primary Examiner—Willis Little
Attorney, Agent, or Firm—Finnegan, Henderson, Farabow, Garrett & Dunner

[57] ABSTRACT

Sausages leaving a sausage-making machine as a string are arranged into groups suitable for packing by transferring them onto a conveyor belt, subsequently orienting them with their respective longitudinal axis extending obliquely with respect to the conveying direction of the conveyor belt and thereafter restraining the sausages to turn them to a transverse orientation relative to the conveying direction so they can be discharged in groups.

26 Claims, 6 Drawing Sheets

METHOD AND APPARATUS FOR ARRANGING SAUSAGES IN GROUPS SUITABLE FOR PACKING

DESCRIPTION

The invention relates to a method and apparatus for arranging sausages leaving a sausage-making machine as a string into groups suitable for packing.

Sausages leaving a sausage-making machine as a string of separate sausages or groups of interconnected sausages are usually packed in a sheet material in groups composed of a selected number of sausages arranged in parallel alignment. To this purpose the sausages leaving the sausage-making installation in straight alignment have to be rearranged into compact groups of parallel sausages. In practical applications this rearrangement is still carried out manually by an operator seizing the sausages discharged from the sausage-making machine onto a conveyor belt and depositing the manually in aligned groups on the same conveyor belt or another conveyor belt leading to a packing machine. It is also possible to automatically suspend strings of interconnected sausages in the form of loops from bars of a so-called suspension line. In this case, however, manual intervention is also required for transferring the rods with the sausage loops suspended therefrom to a packing machine, whereat the sausages have again to be manually arranged into groups in preparation of being packed. In this case, moreover, the groups of sausages are not arranged side by side in a single layer, but rather in two layers disposed above one another.

It is an object of the present invention to provide a method and apparatus permitting sausages leaving a sausage-making machine as a string to be arranged into groups suitable for packing.

According to one aspect of the invention, this object is attained by the provision that the sausages are placed on a conveyor belt, subsequently oriented with their respective longitudinal axis obliquely with respect to the conveying direction of the conveyor belt, and thereafter restrained to be thereby turned to a transverse orientation relative to the conveying direction prior to being discharged in groups.

In this manner it is possible to obtain a great variety of configurations of sausage groups. The method permits not only separate sausages to be thus arranged in groups suitable for packing, but also strings of interconnected sausages. In the latter case, pairs of interconnected sausages may be arranged in a V-configuration, and strings of more than two sausages in a zig-zag configuration for their further conveyance on the conveyor belt. The subsequent restraining step causes the sausages conveyed in the V-configuration or zig-zag configuration to be pushed together, accordion-wise, until they lie parallel to one another in a single-layer group ready for packing; in a manner of speaking, the thus grouped sausages still retain their zig-zag configuration.

In the case of interconnected pairs of sausages, the sausages arranged in the V-configuration by the deflecting step may be pushed together in the restraining step until they assume a parallel alignment in a similar manner as the zig-zag configuration of longer strings, the V-configuration being preferably arranged with its apex pointing transversely of the conveying direction.

It is also possible, however, to employ a centering device for aligning the obliquely oriented sausages of interconnected pairs thereof at a substantially centered position with respect to the longitudinal centerline of the conveyor belt (or a line extending parallel thereto), In this case the V-configuration of each pair of sausages is preferably arranged with its apex pointing in the conveying direction, so that the subsequent restraining step results in the sausages of the pair being unfolded or straightened. As a result, the two interconnected sausages of each pair are aligned at right angles to the string of sausages leaving the sausage-making machine. One or more of such pairs of sausages aligned at right angles to their original orientation may be combined to form a group ready for packing.

The oblique orientation of the sausages is suitably brought about by exerting a force acting transversely of the conveying direction on the leading and/or trailing end portion of the sausages. This force acting transversely of the conveying direction may suitably exerted on each sausage leaving the sausage-making machine separately, or on every second sausage or every second connecting portion between adjacent sausages in the case of sausages leaving the sausage-making machine in the form of an interconnected string.

An apparatus for attaining the above defined object of the invention comprises a substantially horizontal conveyor belt extending from the discharge end of the sausage-making installation in alignment with its conveying direction, a deflector device acting on the sausages for orienting them obliquely with respect to the conveying direction, the deflector device being reciprocally mounted laterally above the conveyor belt, and a restraining device extending transversely of the conveying direction at a spaced location downstream of the deflector device.

This structurally simple apparatus permits not only separate sausages, but also interconnected strings of sausages to be rapidly, safely and accurately arranged in compact groups ready for packing, and that without any manual intervention, so that the resulting groups of parallel sausages may then be automatically fed to a packing machine for automatic packing. The apparatus according to the invention is thus for instance capable of arranging sausages weighing about 80 g into compact groups suitable for packing with an output of 450 pieces per minute or more.

The deflector device preferably comprises a substantially vertical rotary shaft carrying at least one radially projecting deflector arm with a deflector finger pointing towards the conveyor belt. The deflector arm is rotated at a speed depending on the length and spacing of the sausages, so that its deflector finger periodically applies a lateral force pulse to the leading or trailing end portion of each sausage leaving the sausage-making machine separately, or, in the case of strings of interconnected sausages leaving the machine, to every second connecting portion between adjacent sausages, to thereby orient individual sausages preferably parallel to one another at oblique positions, while strings of interconnected sausages are arranged in a zig-zag configuration. The intermittent engagement of the at least one deflector arm of the deflector device with the string of sausages is comparable to the engagement of the teeth of a gear with those of a rack. The driven conveyor belt acts to push the obliquely oriented sausages against the restraining device, as a result of which the sausages are aligned parallel to one another in close mutual contact.

The deflector finger is advantageously radially adjustable and adapted to be secured in position on the deflector arm. This permits the deflector device to be adjusted to varying dimensions and positions of the sausages on the conveyor belt, and the oblique orientation of the sausages to be varied. In this case it is advantageous, specifically in the case of a deflector device having two deflector arms at diametrally opposite positions, to mount at least one of the associated deflector fingers in a manner permitting it to be adjusted to a neutral position, so that one of the two fingers used for obliquely orienting separate sausages can be deactivated when the sausages to be so oriented are interconnected in the form of a string.

The deflector device may also have a rotary shaft extending obliquely with respect to the conveying direction and carrying at least one radially projecting deflector arm with a deflector finger pointing towards the conveyor belt.

The deflector device may also comprise a plunger mounted laterally above the conveyor belt for movement transversely thereacross.

The restraining device preferably comprises a backup gate extending substantially transversely of the conveying direction and mounted for displacement between a restraining position closely above the conveyor belt and a release position away from the conveyor belt. As a precaution against damage of sausages by the backup gate, the end of the latter acting as the leading end on displacement to the backup position may advantageously be rounded.

At the location of the restraining device there may advantageously be provided a flat tongue extending closely above the conveyor belt substantially in opposition to the conveying direction for underpassing the sausages. This tongue acts to relieve the thruft exerted by the conveyor belt on the sausages, so that the sausages are prevented from piling up and their arrangement in a single layer is ensured.

Adjacent the discharge end of the sausage-making installation there is advantageously provided a backup roller rotatable about an upright axis for laterally restraining the sausages in opposition to the deflector device. This is of particular importance in the case of separate sausages for maintaning them in correct alignment with the deflector device to thereby ensure proper engagement of the deflector fingers with the individual sausages.

For laterally retaining the sausages as they are being obliquely oriented, there is preferably provided a guide bar extending substantially along the conveying direction adjacent the boundary of the conveyor belt opposite the deflector device.

To the same purpose guide rails may advantageously be provided adjacent the two boundaries of the conveyor belt between the deflector device and the restraining device. Both the guide bar and guide rails are preferably adjustable.

Between the sausage-making installation and the conveyor belt there is preferably provided a substantially vertical cleaner belt for the removal of sausage meat escaping from ruptured sausages.

The apparatus is preferably further provided with a centering device for the alignment of sausages, particularly interconnected pairs of sausages, at substantially centered positions with respect to the longitudinal centerline of the conveyor belt. A suitable centering device for this purpose may comprise a centering roller adjacent each lateral boundary of the conveyor belt mounted at a respective transversely adjustable position between the deflector device and the restraining device. A centering device of this type permits interconnected pairs of sausages to be arranged in a V-configuration with the apex of the V pointing in the conveying direction, the restraining device subsequently acting to unfold the thus oriented sausages, so that they are restrained by the backup gate in the form of a straightened sausage string.

In a modified embodiment of the invention the deflector device may comprise a paddle wheel disposed above the conveyor belt with its axis of rotation extending transversely thereof, in which case the conveyor belt extends transversely of the sausage-making installation. This embodiment is particularly suitable for processing separate sausages.

Figure 2:
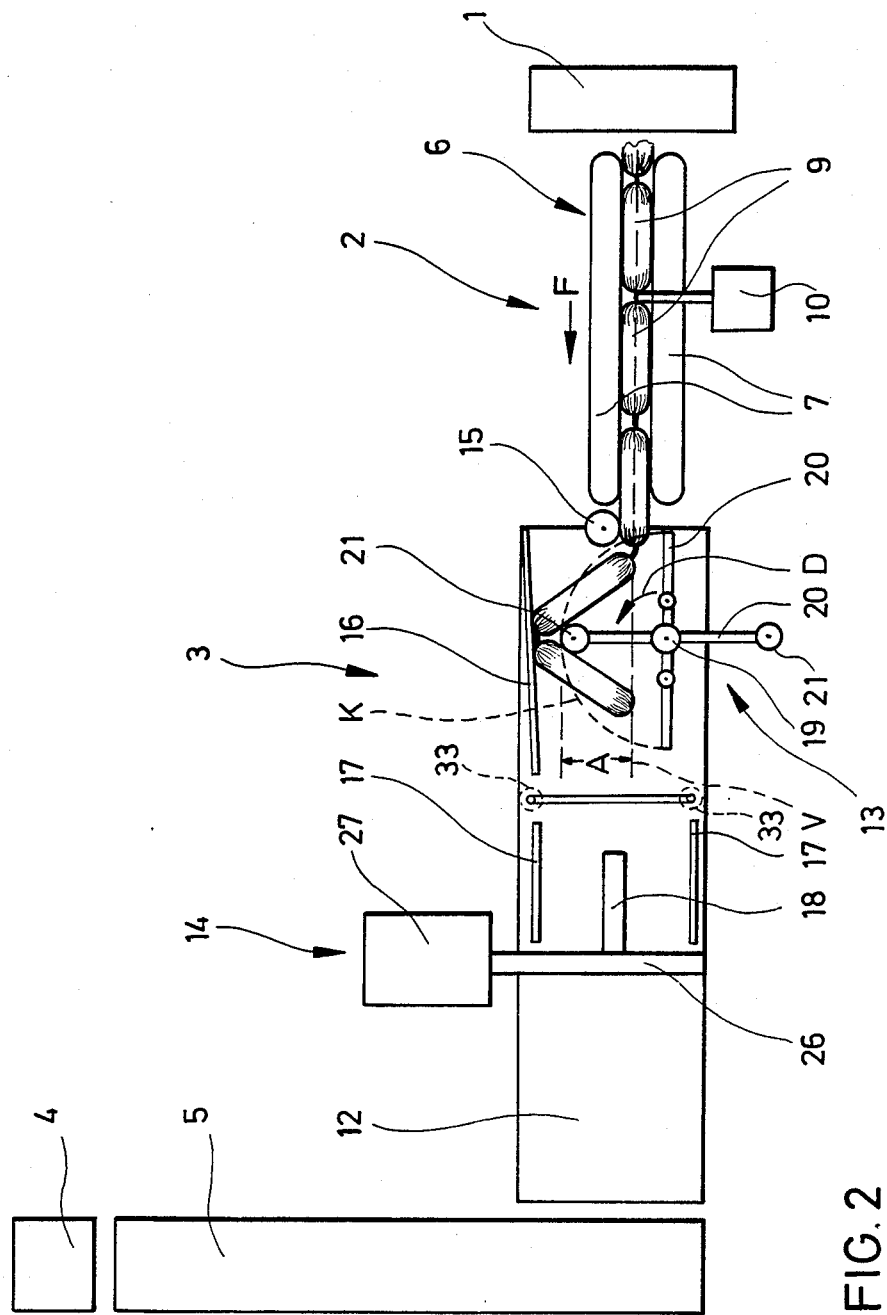
Figure 3:
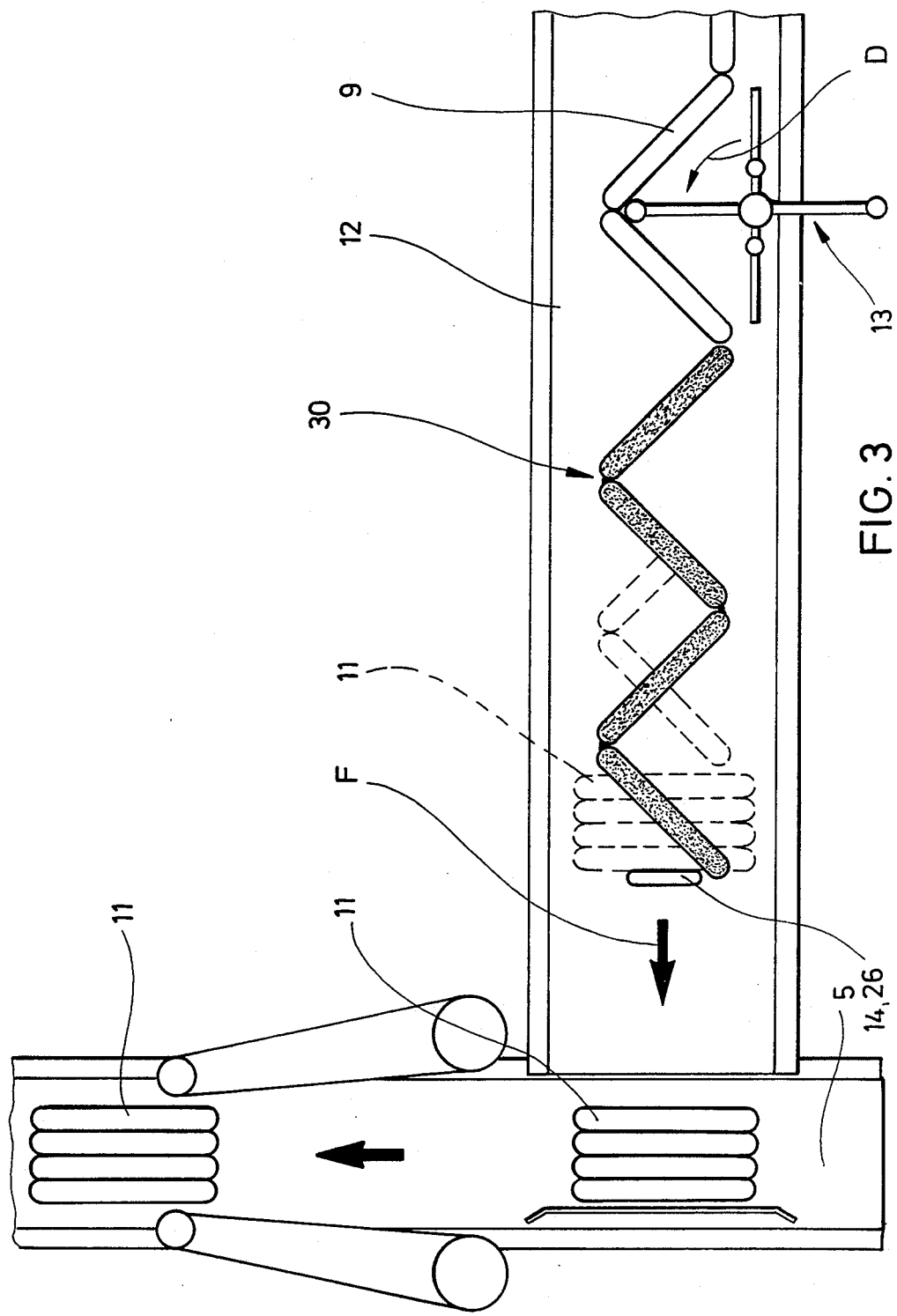
Figure 4:
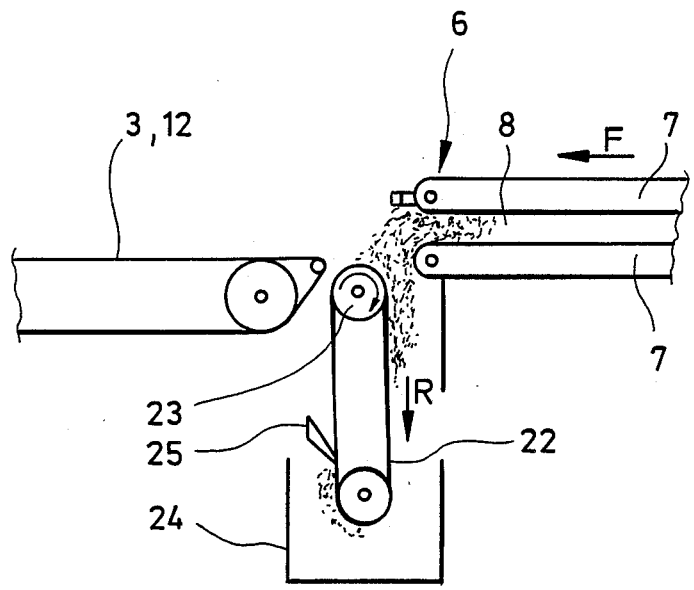
Figure 5:
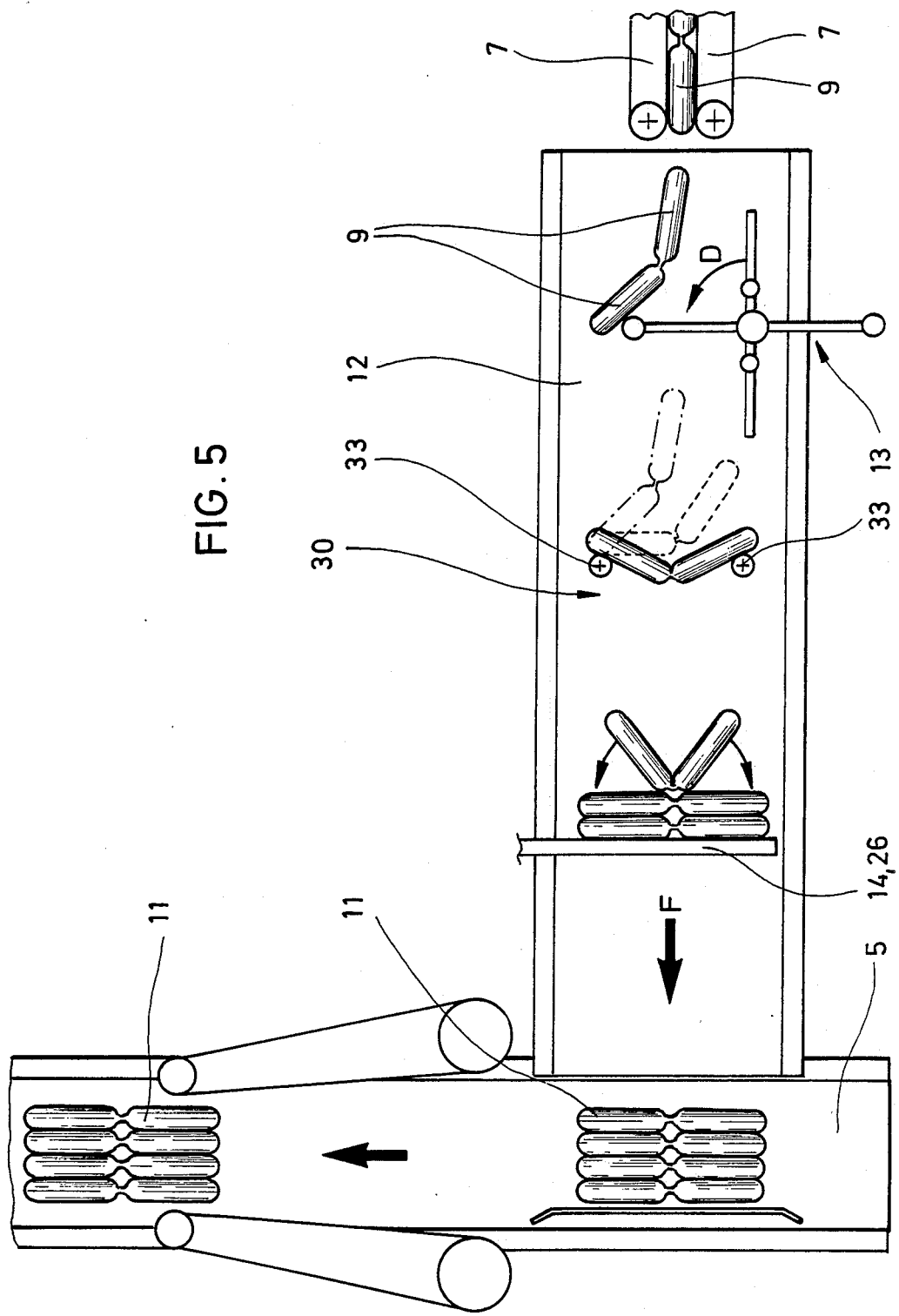
Figure 6:
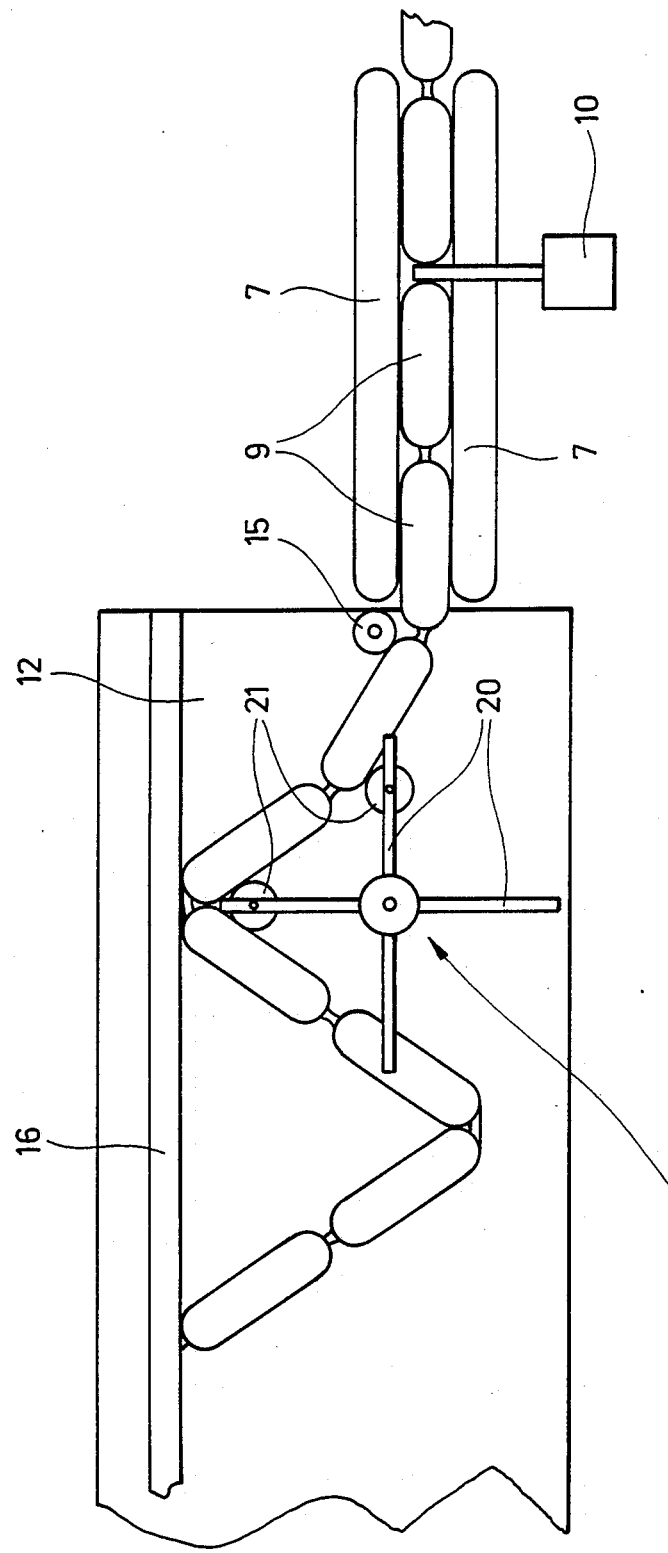

The invention shall now be explained in detail by way of example with reference to the accompanying drawings, wherein:

FIG. 1 shows a general view of a sausage-making installation including apparatus according to the invention for arranging sausages in compact groups suitable for packing, FIG. 2 shows a top plan view of the apparatus according to the invention as depicted in FIG. 1, FIG. 3 shows an enlarged illustration of parts of the apparatus according to the invention depicted in FIG. 2, with a group of obliquely oriented sausages in a zig-zag configuration and in parallel alignment, FIG. 4 shows an enlarged illustration of a cleaner belt depicted in FIG. 1, FIG. 5 shows an enlarged illustration similar to that of FIG. 3 for diagrammatically explaining the steps of obliquely orienting, centering and restraining pairs of interconnected sausages, and FIG. 6 shows a top plan view of apparatus according to FIG. 1 including a deflector device designed for arranging a string of shorter sausages to a zig-zag configuration with each limb composed of two sausages.

FIG. 1 is a diagrammatic illustration of a conventional sausage-making installation consisting of a filling machine 1 and a dividing device 2 connected thereto for filling sausages and dividing the resultant sausage string into individual sausages as by a turning operation. The dividing device 2 is followed by an apparatus 3 according to the invention for arranging the sausages in compact groups suitable for packing, again followed by a conveyor 5 extending transversely of the apparatus 3 according to the invention and leading to a packing machine 4.

As diagrammatically depicted in FIG. 1, and particularly in FIG. 2, the dividing device 2 comprises a metering section 31, a strangler section 32 and a discharge section 6 composed of two endless conveyor belts 7 mounted at a spacing from one another corresponding to the thickness of the sausages 9 so as to define a discharge passage 8 along which the filled sausages 9 are conveyed in a straight line, i.e. in the form of a straight sausage string, in the conveying direction F towards the apparatus 3 according to the invention. Although in practice the two conveyor belts 7 are disposed above one another, their relative position has been rotated about 90° in FIG. 2 for better understanding. Associated to discharge section 6 is a separator device 10 for separating the sausage string into separate sausages 9 or into groups 11 of interconnected sausages.

The apparatus 3 according to the invention comprises a conveyor belt 12, a deflector device 13, a restraining device 14, a backup roller 15, a guide bar 16, two guide rails 17, a tongue 18 and two centering rollers 33.

Deflector device 13 is longitudinally and transversely adjustable relative to conveyor belt 12 and comprises a substantially vertical rotary shaft 19 mounted laterally of conveyor belt 12 and carrying four radially projecting deflector arms 20 disposed in a cruciform arrangement at a level permitting them, in response to the rotation of rotary shaft 19, to pass above conveyor belt 12 without contacting sausages carried thereon. Each deflector arm 20 carries a deflector finger 21 secured thereto at a radially adjustable position and pointing towards conveyor belt 12 so as to contact the sausages thereon for exerting thereon a force causing them to be obliquely oriented. Rotary shaft 19 with its deflector arms 20 is mounted for rotation in the direction of arrow D in FIG. 2. The direction of rotation D corresponds to the conveying direction F, i.e. it is counter-clockwise as seen in FIG. 2. The drive mechanism of deflector device 13 is operatively coupled to that of dividing device 2. Deflector arms 20 are releasably secured to rotary shaft 19 for angular adjustment relative thereto.

In their radially outermost position on their respective deflector arms 20, deflector fingers 21 move along an arcuate path K over conveyor belt 12 as indicated by the dotted line in FIG. 2, this path K intersecting the imaginary extension V of the path of the straight sausage string through discharge section 6. The greatest distance between path extension V and arcuate path K corresponds to the greatest deflection the deflector fingers 21 are capable of imparting the sausages 9 leaving discharge section 6. This distance A can be varied by radial adjustment of the deflector fingers 21.

Disposed adjacent the lateral boundary of conveyor belt 12 opposite deflector device 13 is the guide bar 16 extending in the longitudinal direction of the conveyor belt. It serves the purpose of laterally guiding the sausages as they are being obliquely oriented to thereby prevent them from being excessively deflected. To this purpose guide bar 16 is adjustable transversely of conveying direction F to the smallest distance from arcuate path K required for ensuring the unhampered passage of sausages of a given size.

Backup roller 15 is rotatable about a vertical axis at the transition from discharge section 6 to conveyor belt 12 and at the side thereof opposite deflector device 13 so as to support the sausages leaving discharge section 6 in the correct position relative to deflector device 13 to thereby subsequently ensure their proper oblique orientation, irrespective of whether the sausages leave discharge section 6 separately or in the form of an interconnected string.

Likewise disposed at the transition between discharge section 6 and conveyor belt 12 is a substantially vertically oriented cleaner belt 22 with its upper return pulley 23 mounted slightly below the plane of the upper run of conveyor belt 12. Cleaner belt 22 serves the purpose of intercepting sausage meat leaking from ruptured sausages in discharge section 6 and conveying it to a receptacle 24 disposed therebelow. In this manner any leaking sausage meat is prevented from reaching conveyor belt 12, so that the function of deflector device 13 is not hampered. To this purpose the run of cleaner belt 22 facing towards discharge section 6 is disposed a small distance from the free end of discharge section 6 and moves downwards in the direction towards receptacle 24 as indicated by an arrow R. Associated to the run of cleaner belt 22 facing towards conveyor belt 12 is a doctor blade 25 for removing any sausage meat that might be entrained upwards.

Restraining device 14 comprises a backup gate 26 extending transversely of conveying direction F and adapted to be displaced by means of an actuator 27 disposed laterally above conveyor belt 12 between a restraining position shown in the drawings and a (not shown) release position sideways of conveyor belt 12. In the restraining or backup position of backup gate 26, its lower edge extends closely above conveyor belt 12, so that it acts as a stop for the obliquely oriented sausages approaching it on conveyor belt 12.

The edges of backup gate 26 acting as its leading edges during its displacement to the backup position are rounded so as to avoid damage thereby of the sausages coming into contact therewith. Tongue 18 is secured to backup gate 26 so as to project upstream therefrom against conveying direction F. In the backup position of backup gate 26 tongue 18 is disposed a very short distance above conveyor belt 12, so that the approaching sausages are caused to slide up thereon.

Guide rails 17 are disposed adjacent both lateral boundaries of conveyor belt 12 between deflector device 13 and backup gate 26 and adjustable both longitudinally and transversely with respect to conveying direction F.

The apparatus 3 according to the invention operates as follows:

Sausage meat supplied in containers 28 is filled into sausage-making machine 1, wherein entrapped air is removed therefrom by the application of a vacuum, whereupon the sausage meat is transferred to dividing device 2 via a connecting section 29. Metering section 31 acts to meter determined amounts of the sausage meat to be filled into corresponding sections of a continuous sausage skin in a conventional manner. Strangler section 32 subsequently acts, likewise in the conventional manner, to twist the thus filled sausage skin, resulting in a sausage string consisting of individual sausages connected to one another by strangled or twisted connecting portions. Endless conveyor belts 7 act to convey this sausage string through passage 8 of discharge section 6 and onto conveyor belt 12 of the apparatus 3 according to the invention. Sausage meat leaking from any sausages that might be ruptured in discharge section 6 is intercepted by cleaner belt 22 and deposited in receptacle 24. Separator device 10 may be operated to separate individual sausages or groups of interconnected sausages from the continuous sausage string.

Conveyor belt 12 acts to convey the sausages towards deflector device 13. In the case of interconnected groups of sausages to be obliquely oriented as shown in the drawings, only two diametrally opposite ones of deflector arms 20 carry a respective deflector finger 21 secured thereto. The deflector fingers 21 of the two other deflector arms 20 are either removed therefrom or radially adjusted to positions closely adjacent rotary shaft 19 so as to not come into contact with the sausages.

As rotary shaft 19 is being rotated, deflector fingers 21 carried by the selected deflector arms 20 come into engagement with every second connecting portion 30 between adjacent sausages or with the leading or trailing end portions of respective sausages. By a previous angular adjustment of deflector arms 20 on rotary shaft 19 it is ensured that the engagement of deflector fingers 21 does actually take place at a location substantially adjacent backup roller 15. After this interaction between the deflector arms 20 carrying deflector fingers 21 and the connecting portions 30 has once been established by the described angular adjustment, it is subsequently maintained by synchronizing the rotary speed of deflector device 13 with the conveying speed of discharge section 6 in view of the length of the sausages and their spacing along the string.

As rotary shaft 19 continues to rotate, the deflector fingers 21 of the two deflector arms 20 push the connecting portions 30 of the sausages conveyed on conveyor belt 12 towards the oppositely extending guide bar 16, resulting in a zig-zag configuration of the sausage string as shown in FIG. 3. The engagement of deflector fingers 21 with the sausage string is thus comparable to the camming of a pinion gear with a rack. In view of the shortening of the sausage string resulting from the zig-zag configuration, the speed of conveyor belt 12 is correspondingly lower than the conveying speed of discharge section 6.

Backup roller 15 acts to guide the sausage onto conveyor belt 12 to thereby prevent them, particularly in the case of separate sausages, from being prematurely deflected.

Any excessive deflection of the sausage, as a result for instance of insufficient friction between the sausages and conveyor belt 12, is prevented by guide bar 16.

For the oblique orientation of separate sausages, each deflector arm 20 is provided with a deflector finger 21 secured thereto at a suitable radial position, deflector arms 20 being angularly adjusted on rotary shaft 19 in such a manner that each deflector finger 21 comes into engagement with the leading or trailing end portion of successive sausages so as to obliquely orient the latter by moving along its respective arcuate path.

Conveyor belt 12 acts to convey the thus obliquely oriented separate sausages or interconnected sausages towards backup gate 26 previously moved to its backup position, and onto tongue 18, guide rails 17 being effective to prevent any lateral shifting of the sausages.

As soon as the obliquely oriented separate sausages abut backup gate 26, the continued thrust of conveyor belt 12 causes them to be rotated about the point of abutment to a transverse position in full contact with backup gate 26.

During this transverse alignment of the sausages along backup gate 26, tongue 18 acts to decrease and finally to abolish the thrust exerted by conveyor belt 12 on the sausages. During this phase the sausages still carried on conveyor belt 12 push the sausages already supported on tongue 18 towards and into contact with backup gate 26. Tongue 18 is thus capable of preventing the sausages from piling up in an irregularly layered group. As soon as a number of sausages for forming a single-layer group suitable for packing has thus been accumulated, backup gate 26 is displaced to its release position, permitting the group of sausages to be transferred to conveyor belt 5 for packing in packing machine 4.

The procedure for processing interconnected sausage strings is essentially the same, with the exception that in this case the employ of tongue 18 is not necessarily required, since the sausages show a reduced tendency to pile up above one another due to their being connected to one another. In this case, the leading sausage of the sausage string previously deflected to a zig-zag configuration comes into abutment with backup gate 26 and is subsequently aligned in a transverse position in contact with backup gate 26 in the same manner as a separate sausage. This leading sausage and the ones following it subsequently assume the function of the backup gate, the continued thrust of conveyor belt 12 causing each following sausage to pivot about its respective connecting portion 30 into engagement with the preceding sausage. In this manner the zig-zag configuration of the sausage string is retained as the sausages are pushed together to for a single-layer group 11 suitable for packing. After displacement of backup gate 26 to its release position, these groups 11 are likewise transferred onto conveyor belt 5 for packing in packing machine 4.

It is also possible, however, to convey interconnected pairs of sausages leaving the discharge section of the sausage-making installation in longitudinal alignment in such a manner that they are restrained by the backup gate in straight transverse alignment after a deflection about an angle of 90°. To this purpose a force acting transversely of the conveying direction F is exerted on the leading sausage of each interconnected pair of sausages as illustrated in FIG. 5. As a result, the second sausage of the pair is likewise obliquely deflected, although to a lesser degree. The centering rollers 33 have been adjusted from their inoperative positions shown in FIG. 2 to their operative position illustrated in FIG. 5. In this position, the transverse distance between the rollers 33 is reduced, so that the leading sausage of the pair will engage the righthand centering roller 33 as viewed in the conveying direction F with its leading end portion. The thrust exerted by conveyor belt 12 causes this sausage to be pivoted clockwise about centering roller 33. The trailing sausage of the pair follows this pivotal movement until it abuts the lefthand centering roller 33, whereupon it is pivoted counterclockwise thereabout, so that the interconnected pair of sausages assumes a substantially symmetrical V-configuration with its apex pointing towards backup gate 26. As soon as the apex of this V-shaped pair of sausages abuts backup gate 26, the sausages of the pair are unfolded by pivoting in opposite directions about the point of abutment to come into contact with backup gate 26 in straight alignment. Backup gate 26 may then be displaced to its release position so as to permit the pair of sausages to be fed to packing machine 4. As shown in FIG. 5 it is also possible to accumulate several pair of sausages in the described manner to form a single-layer group suitable for packing for transfer to the packing machine. The above described operations of obliquely orienting pairs of interconnected sausages by means of the deflector device 13, centering the sausages by means of centering rollers 33 and restraining the sausages by means of backup gate 26 are diagrammatically illustrated in FIG. 5.

In place of the above described deflector device 13 it is also possible to employ a deflector device having its axis of rotation oriented obliquely relative to the conveying direction and/or transverse direction of the conveyor belt. Also possible is the employ of a deflector device having a plunger mounted for reciprocation across the conveyor belt in a manner similar to backup gate 26. It is also possible to employ a deflector device in the form of a paddle wheel mounted above a conveyor belt extending at right angles to the discharge section of the sausage-making installation, the axis of rotation of the paddle wheel in this case extending across the conveyor belt. A deflector device of this type is particularly suitable for processing separate sausages. In this case the paddles of the rotating paddle wheel perform the double function of obliquely orienting the discharged sausages and of deflecting their path of travel about an angle of 90°. When the paddles of the paddle wheel extend parallel to the discharged sausages, they merely act to deflect their path of travel without causing them to be obliquely oriented.

For deflecting a string of shorter sausages to a zig-zag configuration with each leg composed of two sausages, two deflector fingers 21 are mounted on respective deflector arms 20 extending at right angles relative to one another as shown in FIG. 6. The second deflector finger is secured to its deflector arm on a smaller radius than the first deflector finger. As a result, the rotation of the deflector device causes both the first and the second sausage to be successively deflected.

Also conceivable are alternative embodiments of the restraining device. It is thus possible to mount a vertically displaceable backup gate above conveyor belt 12. The displacement of this backup gate towards its raised release position may then have a displacement component in the conveying direction F.

We claim:

1. A method for arranging sausages leaving a sausage-making machine as a string into groups suitable for packing, comprising placing the sausages on a longitudinally extending conveyor belt, subsequently orienting them with their respective longitudinal axis extending obliquely with respect to the conveying direction of said conveyor belt and thereafter restraining the sausages to turn them to a transverse orientation relative to the conveying direction so they can be discharged in groups.

2. The method of claim 1 wherein the sausages placed on the conveyor belt are in groups each formed as a continuous string of sausages that are turned to an oblique orientation and subsequently conveyed on the conveyor belt in a parallel, V-shaped or zig-zag configuration.

3. The method of claim 2, wherein the obliquely oriented sausages are subsequently conveyed on the conveyor belt at a reduced speed.

4. The method of claim 1, wherein the oblique orientation of the sausages is accomplished by exerting a force acting transversely of the conveying direction on an end portion of the sausages.

5. The method of claim 4, wherein the sausages placed on the conveyor belt are formed individually and every second sausage is subjected to said force acting transversely of the conveying direction.

6. The method of claim 4, wherein the sausages placed on the conveyor belt are interconnected and every second connecting portion between adjacent sausages is subjected to said force acting transversely of the conveying direction.

7. The method of claim 1, wherein the sausages placed on the conveyor are formed as interconnected pairs and subsequent to their being obliquely oriented, are aligned by means of a centering device to a substantially centered position with respect to the longitudinal center of the conveyor belt.

8. The method of claim 7, wherein the centering device acts to align the interconnected pairs of sausages into a V-shaped configuration, with the apex of the V pointing in the conveying direction.

9. Apparatus for arranging sausages leaving the discharge end of a sausage-making machine as a string into groups suitable for packing, comprising a substantially horizontal conveyor belt extending in a longitudinal direction from and in alignment with the discharge end of the machine, deflector means acting on the sausages for orienting them obliquely with respect to said conveying direction, said deflector means being reciprocally mounted laterally above said conveyor belt, and a restraining means extending transversely of said conveying direction at a speced location downstream of said deflector means to turn the sausages to a transverse orientation relative to said conveying direction so they can be discharged in groups.

10. The apparatus of claim 9, wherein said deflector means comprises a substantially vertical rotary shaft carrying at least one radially projecting deflector arm provided with a deflector finger pointing towards said conveyor belt.

11. The apparatus of claim 10, wherein said deflector finger is radially adjustable along said deflector arm and adapted to be secured in position thereon.

12. The apparatus of claim 10 or 11, wherein said deflector finger is adapted to be placed in a non-operative state.

13. The apparatus of claim 9, wherein said deflector means comprises a rotary shaft disposed obliquely with respect to the conveying direction and carrying at least one radially projecting deflector arm including a deflector finger pointing towards the conveyor belt.

14. The apparatus of claim 9, wherein said deflector means comprises a plunger disposed laterally above the conveyor belt and mounted for displacement transversely across the conveyor belt.

15. The apparatus of claim 9, wherein said restraining means comprises a backup gate extending substantially transversely of the conveying direction and mounted for displacement between a backup position closely above said conveyor belt and a release position away from said conveyor belt.

16. The apparatus of claim 15, wherein said backup gate has a rounded end acting as its leading end during displacement towards its backup position.

17. The apparatus of claim 9, wherein at the location of said restraining means there is provided at a position closely above said conveyor belt a flat tongue directed substantially against the conveying direction for under-passing said sausages.

18. The apparatus of claim 9, wherein adjacent the discharge end of the sausage-making machine there is provided a backup roller rotatable about an upright axis for laterally restraining said sausages in opposition to said deflector means.

19. The apparatus of claim 9, including a guide bar extending substantially along the conveying direction adjacent the boundary of said conveyor belt opposite said deflector means.

20. The apparatus of claim 9, wherein between said deflector means and said restraining means there is provided a guide rail adjacent each boundary of said conveyor belt.

21. The apparatus of claim 9, including means for driving said deflector means that is operatively coupled to the sausage-making machine.

22. The apparatus of claim 9, wherein the conveyor belt operates at a speed lower than the speed of discharge of the sausages from the sausage-making machine.

23. The apparatus of claim 9, wherein between said sausage-making machine and said conveyor belt there is provided a substantially vertically extending cleaner belt for the removal of sausage meat escaping from ruptured sausages.

24. The apparatus of claim 9, wherein said deflector means is in the form of a paddle wheel disposed above said conveyor belt with its axis of rotation extending transversely thereof.

25. The apparatus of claim 9, including centering means for aligning interconnected pairs of sausages at a substantially centered position with respect to the longitudinal centerline of the conveyor belt.

26. The apparatus of claim 25, wherein said centering means comprises a centering roller adjacent each boundary of said conveyor belt mounted at a transversely adjustable position between said deflector means and said restraining means.

* * * * *